(12) United States Patent
Edelmann et al.

(10) Patent No.: US 10,260,564 B2
(45) Date of Patent: Apr. 16, 2019

(54) ROLLING-ELEMENT BEARING UNIT

(71) Applicant: Aktiebolaget SKF, Gothenburg (SE)

(72) Inventors: Ludwig Edelmann, Sulzthal (DE); Matthias Schuler, Stadtlauringen (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/623,504

(22) Filed: Jun. 15, 2017

(65) Prior Publication Data

US 2017/0370415 A1 Dec. 28, 2017

(30) Foreign Application Priority Data

Jun. 22, 2016 (DE) .......................... 10 2016 211 196

(51) Int. Cl.
*B60B 27/00* (2006.01)
*F16C 19/54* (2006.01)
*F16C 33/78* (2006.01)

(52) U.S. Cl.
CPC ........ *F16C 33/7813* (2013.01); *B60B 27/001* (2013.01); *B60B 27/0073* (2013.01); *F16C 19/543* (2013.01); *F16C 33/7886* (2013.01); *F16C 33/7896* (2013.01); *B60B 2900/5112* (2013.01); *B60B 2900/5118* (2013.01); *F16C 2326/02* (2013.01)

(58) Field of Classification Search
CPC ................ F16C 19/543; F16C 33/7813; F16C 33/7886; F16C 33/7889; F16C 33/7896; B60B 27/0073; B60B 27/001; B60B 2900/5112; B60B 2900/5118
See application file for complete search history.

(56) References Cited

U.S. PATENT DOCUMENTS 9,771,982 B2 * 9/2017 Villela .................. F16C 35/061
2015/0071581 A1 * 3/2015 Gieser ................. F16C 33/7886
384/559

FOREIGN PATENT DOCUMENTS

DE 102014202251 * 8/2015
WO WO2013190160 * 12/2013

* cited by examiner

*Primary Examiner* — James Pilkington
(74) *Attorney, Agent, or Firm* — Bryan Peckjian; SKF USA Inc. Patent Dept.

(57) ABSTRACT

A rolling-element bearing unit for a wheel bearing assembly of a vehicle includes a first rolling-element bearing having an outer bearing ring and an inner bearing ring and rolling elements disposed between the outer bearing ring and the inner bearing ring and a first seal element having a seal-element base body having a first support member mounted to an axial outer surface of the inner bearing ring and a first seal lip pressed against a radial end surface of the outer bearing ring to hold the outer bearing ring in position relative to the inner bearing ring. Also a wheel bearing assembly including two such rolling element bearing units.

15 Claims, 2 Drawing Sheets

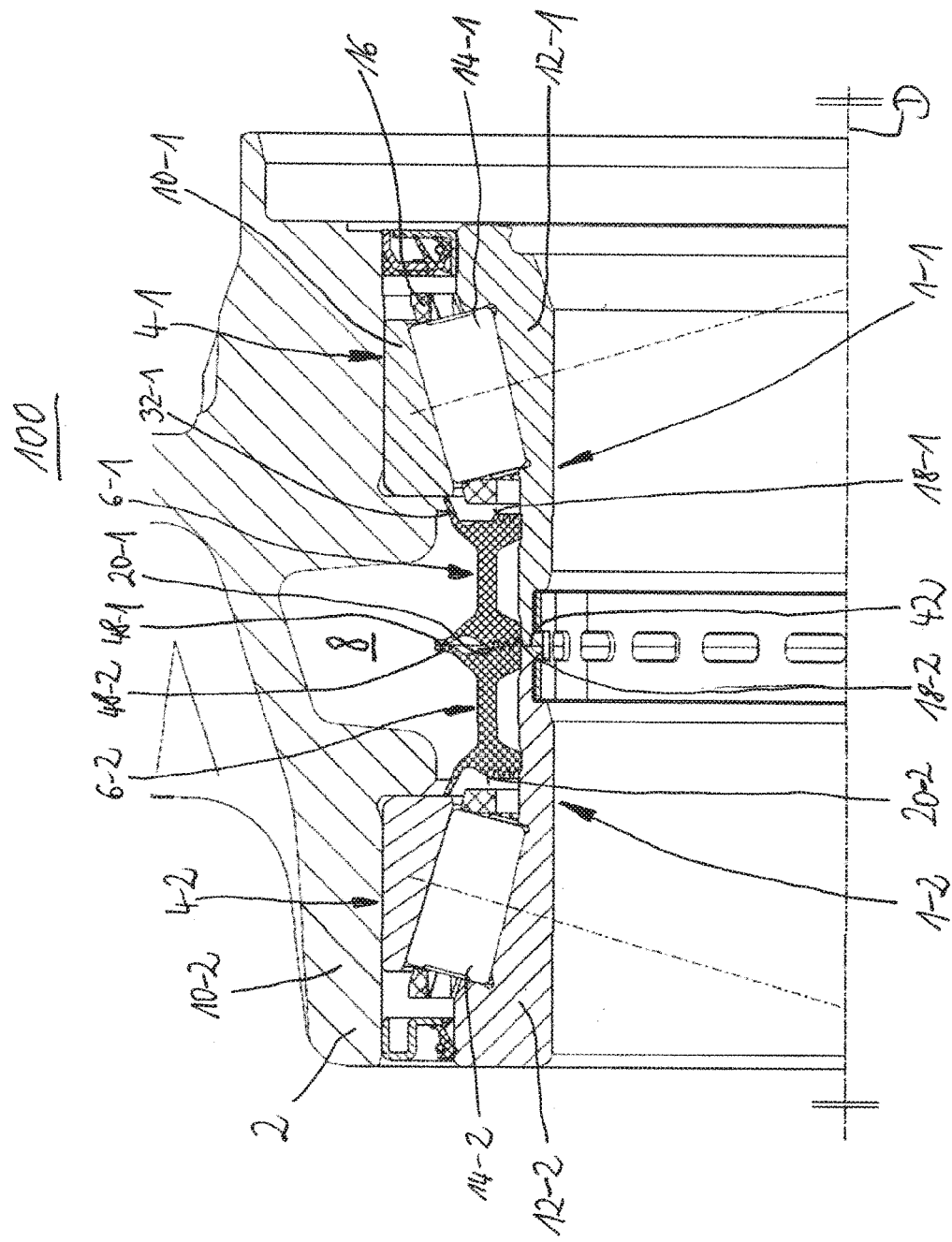

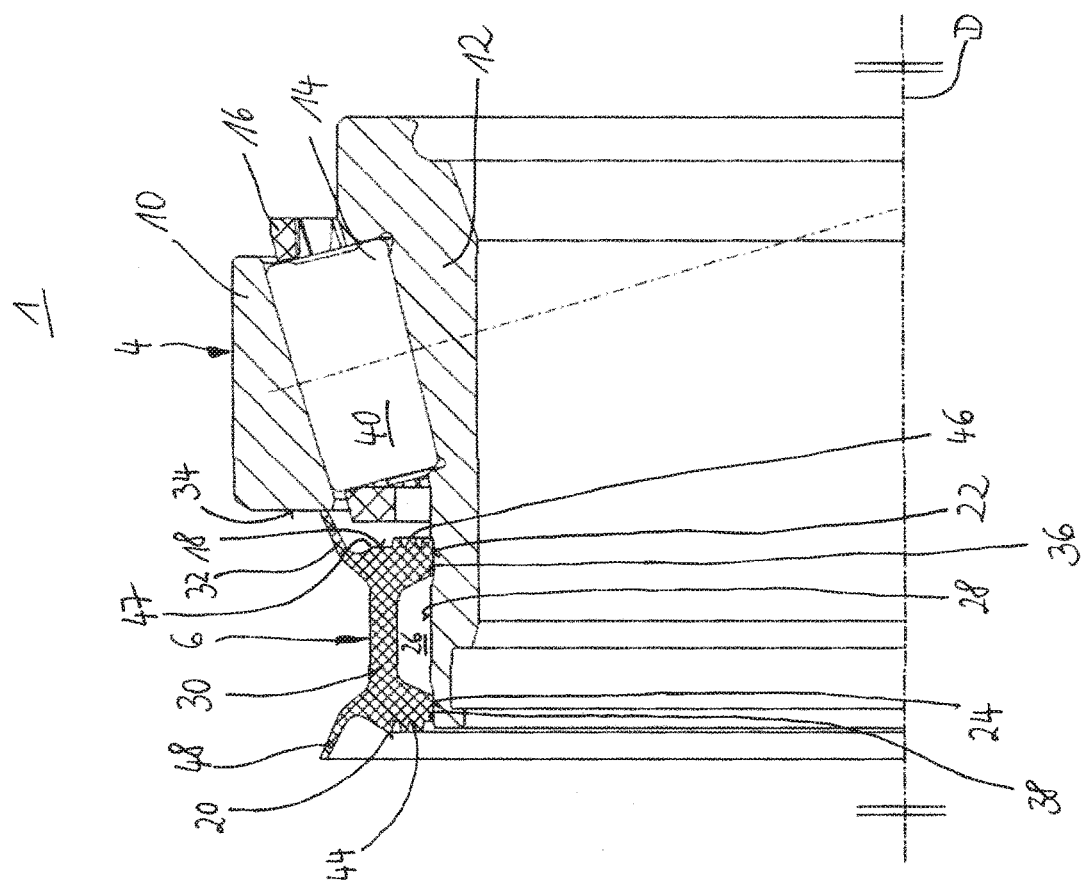

ROLLING-ELEMENT BEARING UNIT

CROSS-REFERENCE

This application claims priority to German patent application no. 10 2016 211 196.5 filed on Jun. 22, 2016, the contents of which are fully incorporated herein by reference.

TECHNOLOGICAL FIELD

The present disclosure relates to a rolling-element bearing unit, in particular for a radial bearing assembly of a vehicle, as well as to a wheel bearing assembly including such a rolling-element bearing unit.

BACKGROUND

It is known from the prior art that wheel bearing assemblies, in particular for commercial vehicles, include two axially adjacent rolling-element bearings each including a bearing outer ring and each including a bearing inner ring, between which rolling elements are disposed. The two rolling-element bearings form a bearing intermediate space between them. Furthermore the two bearing inner rings and/or the two bearing outer rings contact each other by their mutually facing end surfaces and form a butt joint between them. In order to seal the bearing intermediate space in such a wheel bearing assembly in a region of the butt joint, in particular against a penetrating of oil and/or dirt, or in order to reduce an undesired escaping of lubricant from the bearing intermediate space, it is known to dispose a seal in the region of the butt joint.

In order to furthermore provide a simplified installation with such wheel bearing assemblies it is know to respectively preassemble the bearing outer ring and the bearing inner ring with the rolling elements as a rolling-element bearing unit. However, it is problematic that with such a rolling-element bearing unit the bearing rings must be secured during transport in order to prevent a slipping-out of the respective bearing ring from the rolling-element bearing unit or to generally prevent a falling apart of the rolling-element bearing unit.

As known, for example, from the prior art, this can be achieved by a retaining element that secures the bearing rings of the preassembled rolling-element bearing unit during transport. However, it is disadvantageous here that prior to the installation of the rolling-element bearing unit into the wheel bearing the retaining element must be removed again, with the result that production times and manufacturing costs increase.

SUMMARY

It is therefore an aspect of the present disclosure to provide a rolling-element bearing unit for a wheel bearing wherein the bearing rings are secured during transport but can be installed into the wheel bearing quickly and in a simple manner.

In the following a rolling-element bearing unit, in particular for a wheel bearing assembly of a vehicle, is presented that includes a rolling-element bearing including a first and a second bearing ring, between which the rolling elements are disposed. The two bearing rings here are rotatable relative to each other about an axis of rotation. Furthermore, the rolling-element bearing unit includes at least one seal element that includes at least one seal-element base body and at least one first seal lip. The rolling elements can optionally be received in a bearing cage.

In order to provide a rolling-element bearing unit for a wheel bearing wherein the bearing rings are secured during transport but can be installed into the wheel bearing quickly and in a simple manner, it is provided that the seal element is configured as a transport safeguard. The seal-element base body here includes at least one support surface that rests on an axial outer surface of the second bearing ring. The seal element can thereby be axially fixed and secured. Furthermore, the first seal lip supports the first bearing ring on a radial end surface. Due to the presented design and arrangement of the seal element in the rolling-element bearing unit a bearing interior space extending between the first and second bearing ring can be sealed in the axial direction with the result that a lubricant, for example, a lubricating grease, can be retained in the bearing interior during assembly and in the operation of the rolling-element bearing unit. Furthermore, a slipping and/or falling out of the first bearing ring from the rolling-element bearing unit during transport or a falling-apart of the rolling-element bearing unit in general can be prevented by the first seal lip supporting against the first bearing ring.

Preferably the seal element is configured annular and encircling on the second bearing ring. In order to attach the seal element to the second bearing ring the seal-element base body can be fixed to the axial outer surface of the second bearing ring by friction fit, material bond, and/or interference fit, wherein a press fit preferred. In order to position the seal element in a particularly simple manner in its intended position on the axial outer surface of the second bearing ring and prevent a slipping during an operating state, the axial outer surface of the second bearing ring can include at least one recess wherein the seal-element base body engages with the support surface. This can lead to an improved operating safety.

Preferably the presented rolling-element bearing unit is disposed in a wheel bearing or in a multi-row rolling-element bearing assembly.

Therefore a further aspect of the present disclosure relates to a wheel bearing assembly for a vehicle, in particular for a commercial vehicle, including at least one of the presented rolling-element bearing unit. Here it is preferred if two axially adjacent rolling-element bearing units are disposed in the wheel bearing assembly; the rolling-element bearing units form a bearing intermediate space between them, and their second bearing rings contact forming a butt joint. Furthermore the first bearing ring can be disposed on a first component receiving the first bearing ring and/or the second bearing ring can be disposed on a second component receiving the second bearing ring. The component can be, for example, a housing, a wheel hub, a shaft, and/or a stub axle.

In a further preferred exemplary embodiment the seal-element base body includes a first essentially radial end surface and a second essentially radial end surface. As one preferred exemplary embodiment shows, in the wheel bearing assembly the two seal elements are each disposed adjacent in the bearing intermediate space to the axial outer surfaces of the second bearing ring such that they contact each other by their mutually facing essentially radial end surfaces. The two seal elements can thereby seal the butt joint against the penetration of oil and/or dirt in the bearing intermediate space as a unitary seal, in particular as a central seal. Furthermore the escape of lubricant from the bearing intermediate space can thereby be prevented. A further advantage of the presented rolling-element bearing unit is that unlike, for example, a retaining element known from the prior art, the seal element does not need to be removed prior to installation in the wheel bearing assembly, but rather can remain in the wheel bearing assembly.

Preferably the first and/or the second essentially radial end surface of the seal-element base body includes at least one groove and/or at least one land. According to a further exemplary embodiment it is preferred if the at least one groove and/or the at least one land of the first radial end surface of the seal-element base body is configured essentially complementary to the at least one land and/or to the at least one groove of the second radial end surface of the seal-element base body. It is thereby possible to arrange two essentially structurally identical seal elements axially adjacent to each other in the wheel bearing assembly, wherein preferably, as a further exemplary embodiment shows, the at least one groove and/or the at least one land of the radial end surface of the first seal element facing toward the second seal element is configured complementary to the at least one land and/or the at least one groove of the radial end surface of the second seal element facing toward the first seal element. An interference-fit, in particular interleaving, connection between the two seal elements can preferably thereby be formed, which seals the bearing intermediate space as a central seal in a region of the butt joint. Here a press fit preferably acts between the first seal element and the second seal element so that a particularly fixed and sealing connection can be formed between the two seal elements. Furthermore, due to the axially adjacent arrangement of two essentially structurally identical seal elements in the wheel bearing assembly the manufacturing of the seal element is simplified and costs are saved since only one seal-element shape is to be formed.

According to a further preferred exemplary embodiment the seal-element base body includes a second seal lip that is configured mirror-symmetric to the first seal lip. An incorrect installation in the rolling-element bearing unit, for example, due to an incorrect orientation of the seal element, can thereby be prevented. In the wheel bearing assembly the second seal lip of the first seal element can spread against the second seal lip of the second seal element and thereby provide an additional sealing in the region of the butt joint. Furthermore, two essentially structurally identical seal elements can thereby be disposed axially adjacent to each other in the wheel bearing assembly, whereby in turn a simpler manufacturing of the seal element results.

In a further preferred exemplary embodiment the seal-element base body includes one first and at least one second support surface that form an annular cavity between them. This configuration of the seal-element base body is particularly advantageous with an axially widened second bearing ring, which is often used in wheel bearing assemblies since with this configuration of the seal-element base body the seal element can extend over the essentially completely axially widened second bearing ring. Here the cavity formed between the two support surfaces makes possible a simpler installation of the seal elements on the second bearing ring, since excessive friction can be avoided when pushing the seal element on the second bearing ring.

In a further preferred exemplary embodiment the rolling-element bearing of the rolling-element bearing unit is configured as a tapered roller bearing. The presented design of the seal element as transport safeguard finds use in particular in the configuration of the rolling-element bearing as a tapered roller bearing, since in a tapered roller bearing the bearing rings must be supported in transport and/or in the installation into the wheel bearing assembly or into the multi-row rolling-element bearing assembly in order to, for example, prevent a falling apart of the tapered roller bearing or a slipping out of the respective bearing rings. Here in one configuration of the first bearing ring as bearing outer ring and of the second bearing ring as bearing inner ring the presented seal element including the seal-element base body is disposed on the bearing inner ring and supports, with the first seal lip, the bearing outer ring on the radial end surface. Alternatively the first bearing ring can be configured as bearing inner ring and the second bearing ring as bearing outer ring. In this case the presented seal element including the seal-element base body is preferably disposed on the bearing outer ring and supports, with the first seal lip, the bearing inner ring on a radial end surface.

It is furthermore preferred if the wheel bearing assembly and/or the multi-row rolling-element bearing assembly includes two rolling-element bearing units configured as tapered roller bearings, wherein the two tapered roller bearings can be disposed in a face-to-face or back-to-back arrangement. Preferably the two tapered roller bearings are disposed in a back-to-back arrangement so that a sealing in the region of the butt joint can be provided by the two presented seal elements.

A further aspect of the disclosure comprises a wheel bearing assembly of a vehicle comprising a housing having a first opening and a second opening opposite the first opening and a first annular wall and a second annular wall in the housing between the first opening and these second opening. The assembly also includes a first rolling-element bearing unit and a second rolling-element bearing unit, each of the first rolling-element bearing and the second rolling element bearing comprising a first rolling-element bearing having an outer bearing ring and an inner bearing ring and rolling elements disposed between the outer bearing ring and the inner bearing ring and a first seal element having a seal-element base body having a first support member mounted to an axial outer surface of the inner bearing ring and a first seal lip pressed against a radial end surface of the outer bearing ring to hold the outer bearing ring in position relative to the inner bearing ring and a radial end surface on a side of the seal-element base body axially opposite from the first seal lip. The first rolling-element bearing unit is inserted in the first opening of the housing with the outer bearing ring of the first rolling-element bearing in contact with the first annular wall and the second rolling-element bearing unit is inserted in the second opening of the housing with the outer bearing ring of the second rolling-element bearing in contact with the second annular wall and with the inner ring of the second rolling-element bearing forming a butt joint with the inner ring of the first rolling-element bearing and with the radial end surface of the seal-element base body of the first rolling-element bearing in contact with the radial end surface of the seal-element base body of the second rolling-element bearing.

Further advantages and advantageous embodiments are specified in the description, the drawings, and the claims. Here in particular the combinations of features specified in the description and in the drawings are purely exemplary, so that the features can also be present individually or combined in other ways.

In the following the disclosure shall be described in more detail with reference to the exemplary embodiments depicted in the drawings. Here the exemplary embodiments and the combinations shown in the exemplary embodiments are purely exemplary and are not intended to define the scope of the disclosure. This scope is defined solely by the pending claims.

BRIEF DESCRIPTION OF THE DRAWINGS

FIG. 1 shows a schematic cross-sectional view through a wheel bearing assembly including an inventive rolling-element bearing unit; and FIG. 2 shows a schematic detail view of the inventive rolling-element bearing unit according to an exemplary embodiment.

In the following, identical or functionally equivalent elements are designated by the same reference numbers.

DETAILED DESCRIPTION

FIG. 1 shows a schematic cross-sectional view through a wheel bearing assembly 100 of a vehicle, in particular of a commercial vehicle, including a wheel hub 2 receiving two rolling-element bearing units 1-1, 1-2, wherein each of the rolling-element bearing units 1-1, 1-2 includes a rolling-element bearing 4-1, 4-2, configured as a tapered roller bearing, and a seal element 6-1, 6-2. For a better overview, a schematic detail view of the rolling-element bearing unit 1 is depicted in FIG. 2. As furthermore shown in FIG. 1, the two rolling-element bearing units 1-1, 1-2 are disposed axially adjacent to each other in the wheel bearing assembly 100, wherein the two rolling-element bearings 4-1, 4-2 are each disposed axially outward from a center of the wheel bearing assembly 100 and form a bearing intermediate space 8 between them. The two seal elements 6-1, 6-2 are each disposed axially inward of the rolling-element bearings 4-1, 4-2 in the bearing intermediate space 8.

As shown in FIGS. 1 and 2, each of the rolling-element bearings 4-1, 4-2 includes a first bearing ring 10-1, 10-2 configured as a bearing outer ring and a second bearing ring 12-1, 12-2 configured as a bearing inner ring, between which rolling elements 14-1, 14-2 are disposed. The two bearing rings 10-1, 12-1 or 10-2, 12-2 are rotatable relative to each other about an axis of rotation D. The rolling elements 14 can optionally be received in a bearing cage 16.

As depicted in FIG. 2 the two seal elements 6-1, 6-2 each include radial end surfaces 18, 20 and two support surfaces 22, 24, wherein the support surfaces 22, 24 form an annular cavity 26 between them and contact an axial outer surface 28 of the bearing inner ring 12. Furthermore, FIG. 2 shows that the presented seal element 6 is configured as a transport safeguard that secures the bearing outer ring 10 against a falling out and/or slipping during transport.

For this purpose the seal element includes a seal-element base body 30 and a first seal lip 32 that supports the bearing outer ring 10 at the small diameter on a radial end surface 34.

As mentioned above, the first and the second support surfaces 22, 24 rest on the axial outer surface 28 of the bearing inner ring 12, whereby the seal element 6 can extend over the axially widened bearing inner ring 12 of the wheel bearing 100 without causing excessive friction when pushing on the bearing inner ring 12. In order to position the seal element 6 at its intended position on the bearing inner ring 12, recesses 36, 38 can be provided on the axial outer surface 28 of the bearing inner ring 12, into which the seal-element base body 30 including the support surfaces 22, 24 engages.

A bearing interior 40 extending between the bearing inner ring 12 and the bearing outer ring 10 can be sealed by the support surface 22 and the first seal lip 32 so that a lubricant in the bearing interior 40 is retained and a dirt ingress in the bearing interior 40 is prevented.

Furthermore, FIG. 1 shows that the two bearing inner rings 12-1, 12-2 contact on their end surfaces in the radial bearing assembly 100 and form a butt joint 42 between them. The seal elements 6-1, 6-2 thereby contact each other in the region of the butt joint 42 and form a central seal that seals the bearing intermediate space 8 against the penetration of oil and/or dirt or against the escapes of lubricant. In order to achieve a particularly good contact the radial end surfaces of the seal elements 6-1, 6-2, as depicted in particular in FIG. 2, can extend axially out over the radial end surface of the bearing inner ring 12.

Furthermore, grooves 44 or lands 46 are formed on the radial end surfaces 18, 20 of the seal element 6, which grooves 44 or lands 46 are configured such that the end surfaces 18, 20 are configured complementary to each other. Here FIG. 1 shows that in the wheel bearing assembly 100 the radial end surface 20-1 of the first seal element 6-1 contacts the radial end surface 18-2 of the second seal element 6-2 such that the grooves 44 of the first seal element 6-1 and the lands 46 of the second seal element 6-2, which lands 46 are configured complementary to the grooves 44, or the grooves 44 of the second seal element 6-2 and the lands 46 of the first seal element 6-1, which lands 46 are configured complementary to the grooves 44, engage one-into-the-other and form an interleaving. The seal elements 6-1, 6-2 thereby form a central seal and seal the bearing intermediate space 8 in the region of the butt joint 42. In order to form such an interleaving of the mutually complementary end surfaces, the two seal elements 6-1, 6-2 are not disposed mirror-symmetric to each other like the two rolling-element bearings 4-1, 4-2, but rather each in the same orientation in the wheel bearing assembly 100. This means that the radial end-surface pairs 18-1, 18-2 or the radial end-surface pairs 20-1, 20-2 both point in the same axial direction. In order to install the seal element 6 on the bearing inner ring 12 in the correct orientation, one of the radial end surfaces 18 of the seal element 6 includes an installation safeguard, for example, in the form of a shoulder 47.

In the region of the contact surfaces the seal-element base bodies 30 each include a second seal lip 48 that is configured mirror-symmetric to the first seal lip 32. Here the second seal lip 48-1 of the first seal element 6-1 spreads out as shown in FIG. 1 against the second seal lip 48-2 of the second seal element 6-2, with the result that an additional sealing can be provided in the region of the butt joint 42.

Overall using the disclosed rolling-element bearing unit a preassembled rolling-element bearing unit for a wheel bearing can be provided wherein the bearing rings are secured during transport via a seal element, and wherein the bearings rings can be installed into the wheel bearing assembly rapidly and in a simple manner. For this purpose the seal element includes at least one first seal lip that supports the first bearing ring on a radial end surface. The seal lip is in turn carried by a seal-element base body that ensures a stable retaining of the seal element on the second bearing ring. Furthermore a wheel bearing assembly is presented that includes two axially adjacent rolling-element bearing units that form a butt joint between them. The seal elements of the rolling-element bearing units in turn ensure a sealing of the bearing intermediate space in the region of the butt joint by the contacting of their mutually facing radial end surfaces. Here the mutually facing radial end surfaces of the seal elements preferably include grooves and/or lands configured complementary to each other, via which the two seal elements form an interference-fit connection and thus form a particularly good central seal. Because of the seal element it is also possible to pre-fill the rolling-element bearing unit with a lubricant prior to installation. It is furthermore advantageous that the seal element configured as a transport safeguard can remain in the wheel bearing even in the assembled state.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling element bearing units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100 Wheel bearing assembly
1 Rolling-element bearing unit
2 Wheel hub
4 Rolling-element bearing
6 Seal element
8 Bearing intermediate space
10 First bearing ring
12 Second bearing ring
14 Rolling elements
16 Bearing cage
18, 20 Radial end surface of the seal element
22, 24 Support surface of the seal element
26 Cavity
28 Axial outer surface of the second bearing ring
30 Seal-element base body
32 First seal lip
34 Radial end surface of the first bearing ring
36, 38 Recesses on the second bearing ring
40 Bearing interior
42 Butt joint
44 Groove
46 Land
47 Shoulder
48 Second seal lip
D Axis of rotation

What is claimed is:

1. A rolling-element bearing unit for a wheel bearing assembly of a vehicle, comprising:
   a first rolling-element bearing having an outer bearing ring and an inner bearing ring and rolling elements disposed between the outer bearing ring and the inner bearing ring;
   a first seal element having a seal-element base body having a first support member mounted to an axial outer surface of the inner bearing ring and a first seal lip pressed against a radial end surface of the outer bearing ring to hold the outer bearing ring in position relative to the inner bearing ring, and
   wherein the seal-element base body includes a first substantially radial end surface and a second substantially radial end surface, and wherein the first radial end surface and the second radial end surface each includes at least one groove and at least one land.

2. The rolling-element bearing unit according to claim 1, wherein the at least one groove and the at least one land of the first radial end surface is complementary to the at least one land and to the at least one groove of the second radial end surface.

3. The rolling-element bearing unit according to claim 1, wherein the seal-element base body includes a second seal lip mirror-symmetric to the first seal lip.

4. The rolling-element bearing unit according to claim 1, wherein the seal-element base body includes a second support member spaced from the first support member and an annular cavity between the first support member and the second support member.

5. The rolling-element bearing unit according to claim 1, wherein the rolling-element bearing is a tapered roller bearing.

6. The rolling-element bearing unit according to claim 1,
   wherein the at least one groove and the at least one land of the first radial end surface are complementary to the at least one land and to the at least one groove of the second radial end surface,
   wherein the seal-element base body includes a second seal lip mirror-symmetric to the first seal lip,
   wherein the seal-element base body includes a second support member spaced from the first support member and an annular cavity between the first support member and the second support member, and
   wherein the rolling-element bearing is a tapered roller bearing.

7. A wheel bearing assembly for a vehicle, including at least one rolling-element bearing comprising:
   a first rolling-element bearing having an outer bearing ring and an inner bearing ring and rolling elements disposed between the outer bearing ring and the inner bearing ring;
   a first seal element having a seal-element base body having a first support member mounted to an axial outer surface of the inner bearing ring and a first seal lip pressed against a radial end surface of the outer bearing ring to hold the outer bearing ring in position relative to the inner bearing ring,
   a second rolling-element bearing having an outer bearing ring and an inner bearing ring and rolling elements disposed between the outer bearing ring and the inner bearing ring of the second rolling-element bearing and a first seal element having a seal-element base body having a first support member mounted to an axial outer surface of the inner bearing ring of the second rolling-element bearing and a first seal lip pressed against a radial end surface of the outer bearing ring of the second rolling-element bearing to hold the outer bearing ring of the second rolling-element bearing in position relative to the inner bearing ring of the second rolling-element bearing, the second rolling-element bearing being mounted axially adjacent the first rolling-element bearing and defining an intermediate space between the rolling elements of the first rolling-element bearing and the rolling elements of the second rolling element bearing with a radially end surface of the seal element of the first rolling-element bearing in contact with a radial end surface of the seal element of the second rolling-element bearing.

8. The wheel bearing assembly according to claim 7, wherein the radially end surface of the seal element of the first rolling-element bearing includes grooves and lands and wherein the radially end surface of the seal element of the second rolling-element bearing includes lands and grooves complementary to and engaged with the grooves and lands of the radially end surface of the first rolling-element bearing.

9. The wheel bearing assembly according to claim 8, wherein the grooves and lands of the first rolling-element bearing are interleaved with the grooves and lands of the second rolling-element bearing.

10. The wheel bearing assembly according to claim 9, wherein the inner bearing ring of the first rolling-element bearing forms a butt joint with the inner bearing ring of the second rolling-element bearing.

11. The wheel bearing assembly according to claim 10, wherein the seal-element base body of the first rolling-element bearing includes a second seal lip axially opposite the first seal lip of the first rolling-element base body and wherein the seal-element base body of the second rolling-element bearing includes a second seal lip radially opposite the first seal lip of the second rolling-element base body and wherein the second seal lip of the first seal-element base body of the first rolling-element bearing is pressed against the second seal lip of the second seal-element base body to form a seal.

12. The wheel bearing assembly according to claim 7 including a housing, wherein the first rolling-element bearing and the second rolling-element bearing are inserted in the housing from opposite sides such that the inner bearing ring of the first rolling-element bearing forms a butt joint with the inner bearing ring of the second rolling element bearing and such that the seal element of the first rolling-element bearing contacts the seal element of the second rolling-element bearing to form a seal.

13. A wheel bearing assembly of a vehicle comprising:
a housing having a first opening and a second opening opposite the first opening and a first annular wall and a second annular wall in the housing between the first opening and the second opening;
a first rolling-element bearing unit and a second rolling-element bearing unit, each of the first rolling-element bearing unit and the second rolling-element bearing unit comprising a first rolling-element bearing having an outer bearing ring and an inner bearing ring and rolling elements disposed between the outer bearing ring and the inner bearing ring and a first seal element having a seal-element base body having a first support member mounted to an axial outer surface of the inner bearing ring and a first seal lip pressed against a radial end surface of the outer bearing ring to hold the outer bearing ring in position relative to the inner bearing ring and a radial end surface on a side of the seal-element base body axially opposite from the first seal lip;
the first rolling-element bearing unit being inserted in the first opening of the housing with the outer bearing ring of the first rolling-element bearing in contact with the first annular wall and the second rolling-element bearing unit being inserted in the second opening of the housing with the outer bearing ring of the second rolling-element bearing in contact with the second annular wall and with the inner ring of the second rolling-element bearing forming a butt joint with the inner ring of the first rolling-element bearing and with the radial end surface of the seal-element base body of the first rolling-element bearing in contact with the radial end surface of the seal-element base body of the second rolling-element bearing.

14. The wheel bearing assembly according to claim 13, wherein the radial end surface of the seal-element base body of the first rolling-element bearing includes lands and grooves interleaved with grooves and lands on the radial end surface of the seal-element base body of the second rolling-element bearing.

15. The wheel bearing assembly according to claim 13, wherein each of the first rolling-element bearing and the second rolling element bearing includes a second lip and wherein the second lip of the first rolling-element bearing engages the second lip of the second rolling element bearing.

* * * * *